Dec. 31, 1968   H. F. McSHANE, JR   3,419,594
CONTINUOUS PROCESS FOR THE HALOGENATION OF
TOLYLENE DIISOCYANATE
Filed April 8, 1966   Sheet 1 of 2

INVENTOR
HERBERT FELIX McSHANE, JR.

BY *DW Boyd*

ATTORNEY

United States Patent Office 3,419,594
Patented Dec. 31, 1968

3,419,594
CONTINUOUS PROCESS FOR THE HALOGENATION OF TOLYLENE DIISOCYANATE
Herbert Felix McShane, Jr., Wilmington, Del., assignor to E. I. du Pont de Nemours and Company, Wilmington, Del., a corporation of Delaware
Filed Apr. 8, 1966, Ser. No. 541,156
8 Claims. (Cl. 260—453)

ABSTRACT OF THE DISCLOSURE

A continuous process for the catalytic halogenation of toluene diisocyanate is now provided utilizing controlled conditions and a positively established main reaction zone. Ring halogenated toluene diisocyanate is recovered from the bottom of the said reaction zone.

Figure 1:
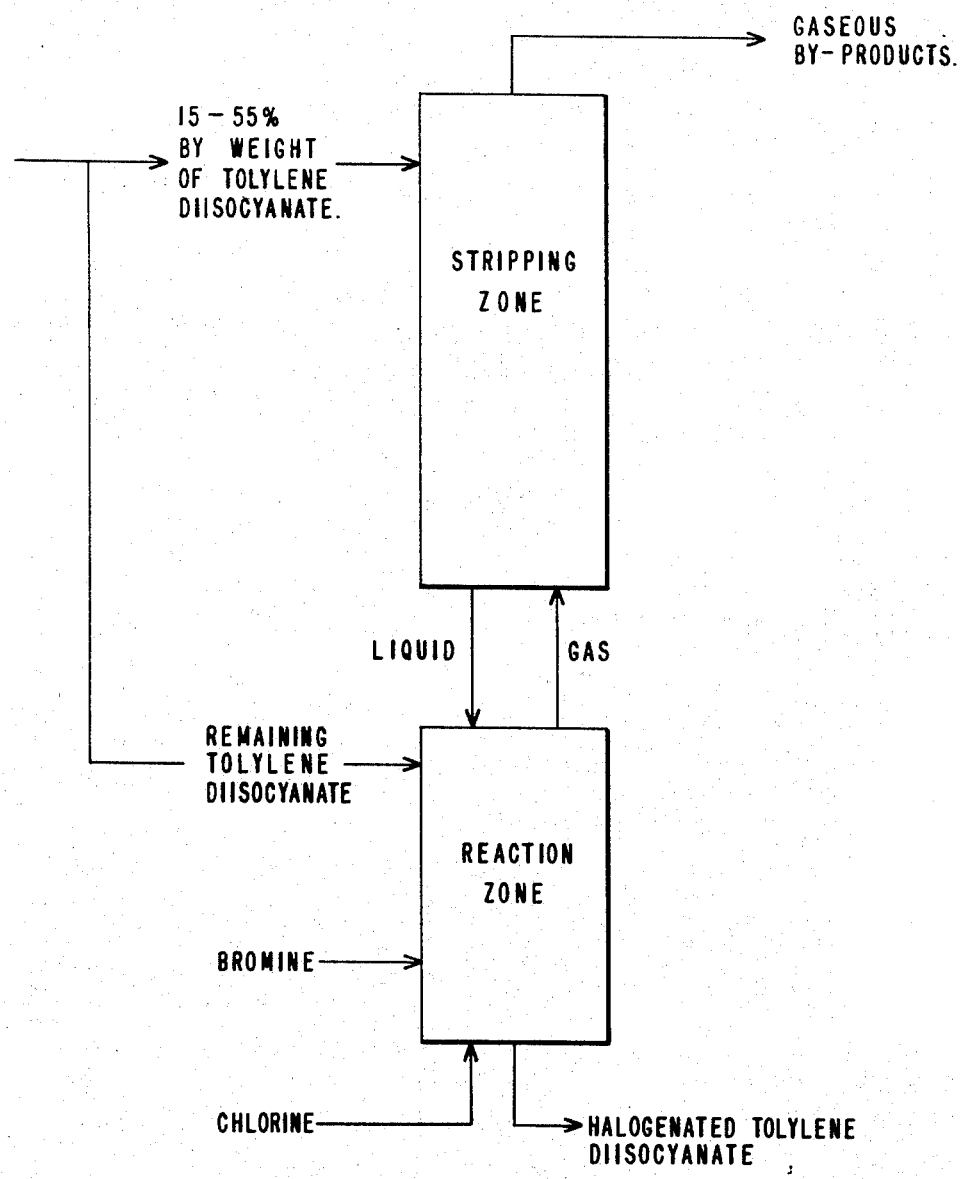

The halogenation of aromatic isocyanates in the presence of catalytic amounts of ferric halides is well known. For example, U.S. 2,915,545 discloses batch halogenation of aromatic isocyanates. In addition, this reference suggests the use of "packed or unpacked towers, bubble tray towers, etc." as suitable types of equipment in which the halogenation of aromatic isocyanates may be accomplished.

When attempts have been made to halogenate aromatic isocyanates containing catalysts in a liquid-full tower according to the suggestion of the art, serious difficulties have been encountered. In this process the aromatic diisocyanate is introduced at the top of the tower and flows countercurrent to the halogen which is introduced at the lower end of the tower. Ideally the greater part of the reaction should occur in the lower part of the tower, the upper part of the tower serving to remove the last part of the halogen from the hydrogen halide by-product. In practice it has been found that the halogenation zone migrates up the tower interferring with the stripping operation and thus leading to the inefficient utilization of the halogen. The reason for the migration of the principal reaction zone into the stripping zone is not known with certainty. However, it appears that the active catalyst is a complex of the ferric halide with tolylene diisocyanate, and that less active complexes are formed with partially halogenated tolylene diisocyanate. In addition, since the reaction is highly exothermic expensive cooling equipment must be provided over much of the length of the reactor to prevent excessive localized temperature rise and the formation of unwanted by-products. In the case of tolylene diisocyanate these difficulties are particularly severe since tolylene diisocyanate is highly reactive and readily undergoes side reactions leading to halogenation of the methyl group rather than the desired halogenation of the aromatic ring, and to formation of unwanted products.

It has now been discovered that tolylene diisocyanate can be halogenated continuously under controlled conditions with a positively established main reaction zone by a process which comprises continuously introducing from 15 to 55% by weight of the total of a solution of from 0.5 to 3% by weight of ferric chloride, ferric bromide or mixtures thereof in the tolylene diisocyanate to be reacted into the top of a stripping zone, said stripping zone being maintained at a temperature in the range between 70° C. and 135° C., passing the liquid effluent from the bottom of said stripping zone into a reaction zone and continuously introducing the remaining part of said solution into said reaction zone and said reaction zone being maintained at a temperature in the range between 70° C. and 135° C., continuously introducing halogens consisting essentially of chlorine and from 0 to 1.0 mole of bromine per mole of chlorine into said reaction zone at a rate sufficient to provide from 1 to 3 moles of halogen per mole of tolylene diisocyanate, and contacting said tolylene diisocyanate with said halogen, passing the gaseous effluent from the top of said reaction zone into the bottom of said stripping zone recovering a gaseous effluent of hydrogen halides from the top of said stripping zone, and recovering ring halogenated tolylene diisocyanate from the bottom of said reaction zone. In a preferred embodiment solvent is also added at the head of the stripping zone as will be explained more fully hereinafter.

This invention will be better understood by reference to the accompanying schematic drawings which describe the process of this invention.

Figure 2:
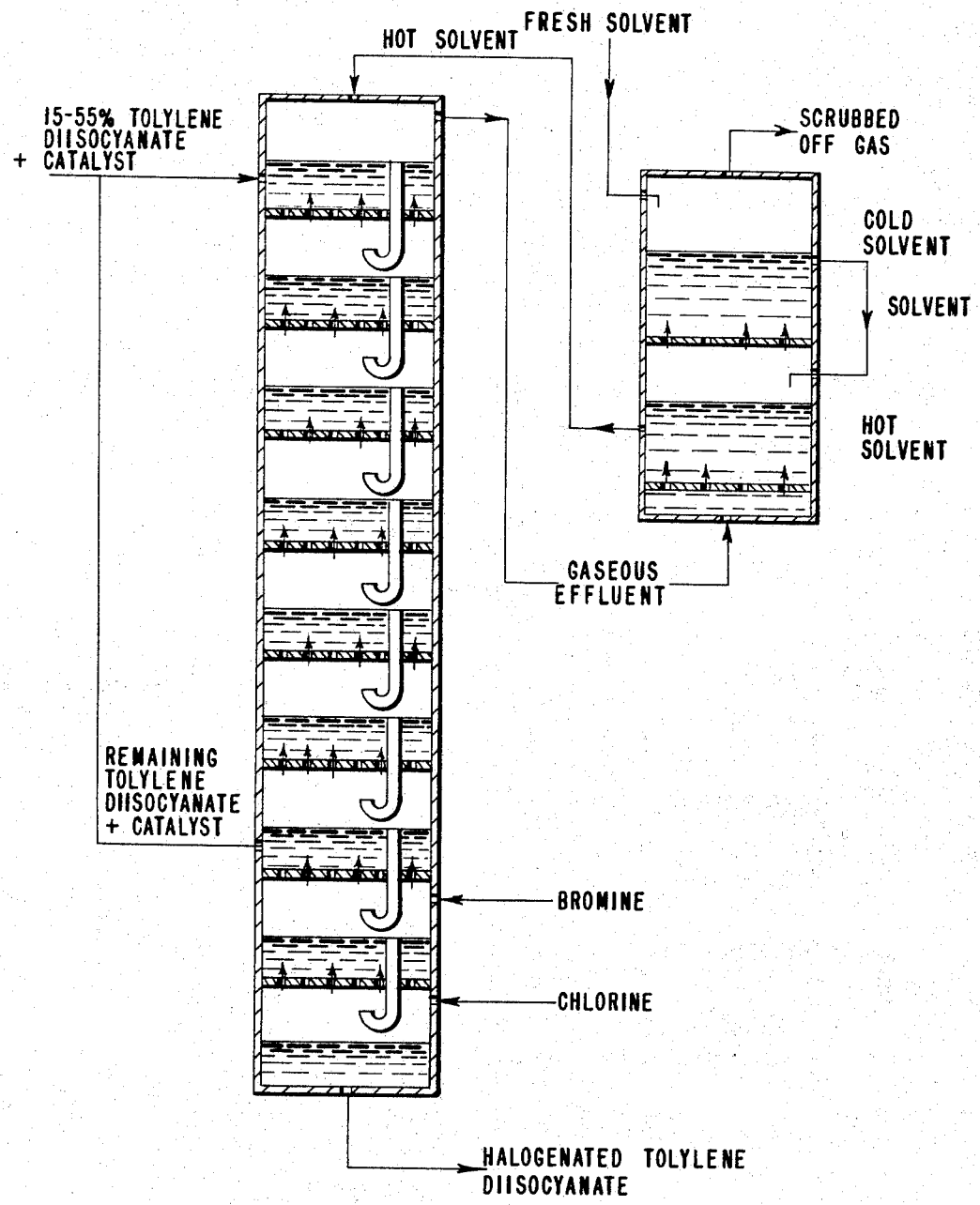

In these drawings:
FIGURE 1 is a block diagram showing the general flow of the various streams to the reaction zone and the stripping zone.
FIGURE 2 is a diagram showing the use of a sieve plate tower with solvent addition at the head of the stripping zone.

The equipment which can be employed to practice the present invention can be a single, staged, reactor tower which can be a sieve plate column, bubble tray column or the like to provide adequate mixing and thus contacting of the reactants. If a single tower is used, the portion of the tolylene diisocyanate and catalyst solution is fed to the top of the tower or column; the remaining portion of the tolylene diisocyanate and catalyst solution is fed to an intermediate point of the tower. The halogen is fed into the bottom of the tower and thus flows countercurrent to the tolylene diisocyanate. The gaseous effluent, consisting essentially of hydrogen halides, is recovered from the top of the tower, and halogenated tolylene diisocyanate product is removed from the bottom of the tower. In such towers, adequate mixing is usually produced by the countercurrent flow of the reactants, however mechanical agitation in either the stripping zone or the reaction zone can be employed to promote contact between the reagents.

Alternatively the stripping zone and the principal reaction zone can be established in separate reactors. The principal reaction can be conducted in a sieve plate column or the like with the contact between the halogen and the tolylene diisocyanate being promoted by countercurrent flow as described hereinabove. The ingredients can also be introduced into a vigorously agitated and cooled vessel. The stripping zone can be bubble tray or sieve tray tower. Falling liquid film or wiped film units can also be used for stripping.

Regardless of the type of equipment employed it is important that the gas phase be thoroughly dispersed throughout the liquid phase in the reaction zone to promote efficient contacting. While vigorously agitated vessels can be employed with the halogen introduced thus through perforated plates, it is generally preferable to employ sieve plate columns or bubble trays columns which have a large length/area ratio so that a high gas velocity is maintained through the reaction mass.

Preferably the equipment should be selected to prevent or minimize mixing of the liquid in the reaction zone with the liquid in the stripping zone, although limited mixing can be tolerated. When a single sieve plate tower is used as the reaction zone and the stripping zone, some mixing occurs between zones but the effect of splitting the diisocyanate feed is great enough to maintain the position of the reaction zone and permit efficient utilization of the halogen by stripping.

The reaction zone in a tower need not be restricted to a single stage. Two or more stages of a tower, each provided with the efficient cooling, may form the reaction zone. If the stages are designed so that little liquid mixing occurs between them, tolylene diisocyanate/ferric chloride solution should be fed to both reaction stages. If considerable liquid mixing occurs between stages, it is only necessary to feed diisocyanate/ferric chloride solution to one of the stages in the reaction zone.

The halogens which can be employed are chlorine and bromine. Chlorine and bromine react with tolylene diisocyanate at about the same rate. However bromine is much more soluble in tolylene diisocyanate, and thus tends to be carried with the liquid rather than the gas phase. Bromine monochloride, which is formed in equilibrium with the elemental halogens by mixtures chlorine and bromine, brominates tolylene diisocyanate at a much greater rate than either halogen separately. Accordingly bromine is used in conjunction with at least an equimolar amount of chlorine.

A preferred reaction zone equipment arrangement for preparing halogenated tolylene diisocyanate largely substituted with bromo groups employs two or more of the lowest plates in a sieve plate or bubble cap plate tower. Bromine is fed below the plate on which tolylene diisocyanate/ferric chloride solution enters the reaction zone. Chlorine is fed at a point at least one plate below the bromine feed. This arrangement minimizes the loss of bromine in the product and permits mixing the bromine and chlorine before they contact the diisocyanate/ferric chloride solution entering the reaction zone. Most of the halogenation takes place on the tolylene diisocyanate/ferric chloride solution feed plate. The use of this arrangement employing the two lowest plates of a sieve plate tower is exemplified hereinafter.

As indicated hereinbefore, the proportion of tolylene diisocyanate to be halogenated which is fed to the reaction zone should range from 45 to 85% of the total diisocyanate. If greater than 85% diisocyanate is fed to the reaction zone, there is not sufficient tolylene diisocyanate for the stripping zone to operate efficiently. If less than 45% of the diisocyanate is fed to the reaction zone, the reaction tends to migrate toward the top of the tower. It is preferred that from 60–80% of the diisocyanate be fed to the reaction zone. This split of the feed provides for good stripping and is adequate to fix the location of the reaction zone.

Temperatures ranging from about 70° C. to 135° C. may be used in both zones of the present process. Below about 70° C. formation of solid carbamyl chloride interferes with the operation of the equipment. Above 135° C. side reactions, the most serious one being α-halogenation on the methyl group, assume significance. The temperature range of 90° C. to 110° C. is especially preferred. While it is usually convenient to maintain about the same temperature in both the reaction and stripping zones, it is possible to operate the present process with the zones at different temperatures.

As catalysts in the present process about 0.5 to 3.0% by weight of ferric chloride or ferric bromide based on tolylene diisocyanate may be used. The ferric halide is most conveniently used by dissolving it in the diisocyanate prior to introduction to the tower reactor. It has been found that solutions prepared by simply adding ferric chloride to tolylene diisocyanate form sufficient amounts of solids to interfere with the operation of the reactor. For that reason stable solutions of ferric chloride prepared by the procedure outlined hereinafter are preferred.

The stable solutions consist of tolylene diisocyanate having dissolved therein ferric chloride catalyst and a stabilizing amount of chlorine or bromine. The addition of the stabilizing and catalyst ingredients should be made at 15° C. to 75° C. but a range of 40–60° C. is preferred. The stabilizer should be added to the diisocyanate just prior to the addition of catalyst. The amount of stabilizer used should range from 0.1 to 0.65 mole of halogen per mole of tolylene diisocyanate. The amount of ferric chloride used may approach 3.0% by weight based on the diisocyanate. A preferred solution contains about 1.5% ferric chloride and is particularly useful for preparing a halogenated tolylene diisocyanate which can be used in foams without distillation.

The process of this invention can be used to prepare chlorinated or brominated tolylene diisocyanates. It is particularly useful for preparing derivatives which contain both bromine and chlorine substituents. In producing brominated derivatives both bromine and at least a chemically equivalent amount of chlorine should be used rather than bromine alone. Pure bromine is not only expensive, but its use increases the proportion of tars and α-halogenated diisocyanate by-products. For this reason, this invention is restricted to the use of chlorine or mixtures of chlorine and bromine containing at least 50 mole percent chlorine. For the same reason, the reaction zone should be designed to minimize the loss of bromine, unaccompanied by excess chlorine, in the product.

The number of halogen substituents which can be introduced into each molecule of tolylene diisocyanate ranges from about one to three. The products resulting from this process are generally a mixture. For example, a product which is predominantly dichlorinated will also contain mono- and trichloro derivatives. For most purposes, there is no need to separate the derivatives, but this can be done by conventional physical separation techniques, such as distillation and recrystallization, when desired.

The degree of halogenation can be controlled by adjusting the mole ratio of halogen to tolylene diisocyanate entering the process. Since halogen is utilized efficiently, the actual degree of substitution is only about 5–10% less than the mole ratio of the materials fed to the process.

The process of this invention can be used to halogenate 2,4- or 2,6-tolylene diisocyanate or mixtures thereof. Because of availability, an 80:20 mixture of the 2,4- and 2,6-isomers is a preferred starting material.

A limited amount of an inert solvent having a boiling point below that of tolylene diisocyanate may be used to advantage in the present process. In the present process, the by-product off-gas contains tolylene diisocyanate vapors. While the loss of diisocyanate resulting from this source is not serious, it is however sufficient to cause pluggage of the off-gas lines with solid carbamyl chlorides which are formed when the gas stream, consisting mainly of hydrogen chloride, is allowed to cool. Additional benefits are obtained if all of the solvent is introduced into the top of the stripping zone. This minimizes the tendency for carbamyl chlorides to form in the off-gas system. The solvent may be introduced as a separate stream into the top of the stripping zone or may be mixed with the diisocyanate prior to introduction into the column. Solvent may, however, be introduced into the reaction zone if desired. If a solvent is used, the off-gas also contains solvent vapors which condense when the off-gas is cooled and provide reflux to return diisocyanate to the reactor system. Solvent feed may also be split between the two zones.

The undesirable formation of carbamyl chloride in the off-gas lines can be completely eliminated by scrubbing the off-gas with fresh solvent entering the process in the following way. Hot off-gas, at the temperature of the top plate of the tower reactor, is passed up a two-stage scrubbing tower countercurrent to solvent. Cold solvent is introduced into the upper stage of the scrubber. The upper stage is operated at about ambient temperature or below. The lower stage is operated at a temperature above the decomposition point of carbamyl chloride which is about 80–85° C. under the conditions existing in the scrubber. In the lower stage the hot solvent extracts tolylene diisocyanate vapor and then enters the reaction system. At the same time, considerable amounts of solvent vaporize into the off-gas. In the upper stage, the concentration of solvent vapor in the off-gas is reduced by scrubbing with cold solvent. A scrubbing tower having more than two stages may be used as long as the conditions indicated above are maintained on the uppermost and lowest plates.

With a properly designed tower, only two plates are needed.

1,1,2,2-tetrachloroethane has been found to be a particularly useful solvent for use in the present process. Other representative solvents include trichloroethane, pentachloroethane and difluorotetrachloroethanes. The quantity of solvent used can exceed the weight of the tolylene diisocyanate fed to the process. However, 5 to 25% solvent by weight based on the diisocyanate is preferred and about 10% solvent is especially preferred.

The products made using the method of this invention are known to be useful for the production of polyurethane foams having improved flame resistance. In general the flame resistance of foams made with the halogenated tolylene diisocyanates is proportional to the weight percent of halogen contained in the foams. For this reason, mixtures of halogenated tolylene diisocyanates containing a large amount of bromine and minor amounts of chlorine are preferred for foam preparation.

The crude products obtained by the process of this invention can be used to manufacture polyurethane foam without further refining by distillation or otherwise. It is desirable however to heat the crude product to a temperature in the range of 150° C. to 220° C. at reduced pressure or with an inert gas sparge to remove volatile impurities which tend to interfere with foam preparation.

This invention is further illustrated by the following example which is not however intended to fully delineate the scope of this discovery.

EXAMPLE

The reactor used in this example is a sieve plate tower having an inside diameter of about 2 inches. The tower has seven plates each containing 114 holes (1/16 in. diameter) and a J-leg (3/8 in. inside diameter) through which the gas phase rises and the liquid phase descends respectively. The plates in the tower are spaced 16 inches apart with the exception of plates 5 and 6 (numbering from the top) which are 37 inches apart. The volume between these plates is about 3 times larger than that between the other plates by virtue of the plate spacing and slightly larger inside diameter for this portion of the tower. The tower is operated liquid-full to the top of plate 1 and, therefore, provides seven active plates. Each of the spaces between plates is jacketed so that heating or cooling is possible.

In use, 34 g./min. of a 1.48% solution of ferric chloride in tolylene diisocyanate (80% 2,4-isomer; 20% 2,6-isomer) is fed continuously to the top of the tower and 103 g./min. of the same solution is fed continuously between plates 5 and 6 of the tower. About 13.3 g./min. of tetrachloroethane is also fed to plate 1. Chlorine is introduced continuously below plate 7 at a rate of 58 g./min. and bromine is introduced continuously just below plate 6 as a rate of 102 g./min. Halogenated tolylene diisocyanate is removed through an overflow leg at the bottom of the tower at a rate such that the liquid level in the tower is constant. The mixed halogen gases flow up the tower becoming less concentrated as they are consumed and replaced by by-product hydrogen chloride. Because bromination proceeds more rapidly than chlorination, the gas discharged at atmospheric pressure at the top of the tower is a mixture of hydrogen chloride and chlorine. The jackets provided on the tower are used to maintain a temperature of about 100° C. throughout the length of the tower.

The off-gas from this equipment contains 1.9 mole percent chlorine in hydrogen chloride. No bromine can be detected in the off-gas. The halogenated tolylene diisocyanate produced contains 1.63 atoms of bromine/mole of halogenated tolylene diisocyanate and 0.17 atom of chlorine/mole of halogenated tolylene diisocyanate. The halogenated tolylene diisocyanate is analyzed by vapor phase chromatography. The total halogen content of the product determined by the Parr bomb procedure is in agreement with the chromatographic data.

When the off-gas from this equipment is passed directly to a cold condenser or through unheated lines, deposits of solid carbamyl chloride are formed which eventually necessitate shutting down because of restricted flow. This problem is completely avoided by scrubbing the off-gases from the halogenation tower with the 13.3 g./min. of tetrachloroethane employed in the process. The scrubbing tower used has an inside diameter of about 2 in. and contains two sieve plates with 1/16 in. holes. The plate spacing is about 6 in. The plates are not provided with liquid downcomers. Instead, an overflow is positioned about 5 in. above each of the plates. Liquid overflowing the upper plate is fed to the lower plate. Liquid overflowing the lower plate is fed to the plate 1 of the reactor as previously described. Fresh solvent entering the process is fed to the upper plate of the scrubber. The plates are provided with separate water jackets by which means the upper plate is maintained at about 20° C. and the lower plate at about 100° C. Gaseous effluent from the halogation tower is conducted to the scrubbing tower through lines heated by a heating tape to about 85–100° C. The gaseous effluent enters the scrubbing tower below the lower sieve plate, passes through both plates of the scrubbing tower and is discharged at the top of the scrubbing tower. Similar results can be obtained when the sieve plate column is replaced with a bubble cap plate column.

Since many different embodiments of this invention may be made without departing from the spirit and scope thereof, it is to be understood that this invention is not limited to the specific embodiments thereof except as defined in the appended claims.

I claim:

1. A continuous process for the halogenation of tolylene diisocyanate which comprises: continuously introducing from 15 to 55% by weight of a solution of from 0.5% to 3% by weight of ferric chloride, ferric bromide or mixtures thereof in the tolylene diisocyanate to be reacted into the top of a stripping zone, said stripping zone being maintained at a temperature between 70° C. and 135° C., and passing the liquid effluent from the bottom of said stripping zone to a reaction zone; continuously introducing the remaining part of said solution into a reaction zone, said reaction zone being maintained at a temperature in the range between 70° C. and 135° C., continuously introducing halogen consisting essentially of chlorine and from 0 to 1.0 mole of bromine per mole of chlorine into said reaction zone at a rate sufficient to provide from 1 to 3 moles of halogen per mole of total tolylene diisocyanate, contacting the tolylene diisocyanate with said halogen, passing the gaseous effluent from said reaction zone into the bottom of said stripping zone, recovering a gaseous effluent of hydrogen halide from the top of said stripping zone and recovering ring halogenated tolylene diisocyanate from the bottom of said reaction zone.

2. Process of claim 1 in which the stripping zone is provided by the upper part of a sieve plate column and the reaction zone is provided by the lower part of said column.

3. Process of claim 2 wherein bromine is introduced into said reaction zone below the tolylene diisocyanate/ferric chloride solution feed plate and chlorine is introduced at a point at least one plate lower than the point of bromine addition.

4. Process of claim 1 in which the stripping zone is provided by the upper part of a bubble cap plate column and the reaction zone is provided by the lower part of said column.

5. Process of claim 4 wherein bromine is introduced into said reaction zone below the tolylene diisocyanate/ferric chloride solution feed plate and chlorine is introduced at a point at least one plate lower than the point of bromine addition.

6. The process of claim 1 wherein the gaseous effluent from the top of said stripping zone is further contacted continuously with an inert solvent having a boiling point below tolylene diisocyanate in a countercurrent gas scrubbing tower having at least two stages, said solvent being fed to the uppermost tower stage wherein the temperature is maintained at less than 30° C. and said gaseous effluent being fed to the lowest tower stage wherein the temperature is maintained at greater than 80° C., passing said solvent from the lowest stage of said scrubbing tower to the top of said stripping zone and recovering scrubbed gaseous effluent from the uppermost stage of scrubbing tower.

7. Process of claim 6 wherein said inert solvent is an amount of from 5% to 25% by weight of the total tolylene diisocyanate.

8. Process of claim 7 wherein said solvent is 1,1,2,2-tetrachloroethane.

References Cited

UNITED STATES PATENTS 2,915,545   12/1959   Tazuma _____ 260—453

CHARLES B. PARKER, *Primary Examiner.*

D. H. TORRENCE, *Assistant Examiner.*

U.S. Cl. X.R.

260—2.5, 694